United States Patent [19]

Perkins et al.

[11] 4,434,745
[45] Mar. 6, 1984

[54] BIRD FEEDING DEVICE

[76] Inventors: Noel Perkins, R.F.D. #1, Northwood, N.H. 03261; Thomas Perkins, 5 Tucker St., Gloucester, Mass. 01930

[21] Appl. No.: 431,315

[22] Filed: Sep. 30, 1982

[51] Int. Cl.³ .............................................. A01K 5/00
[52] U.S. Cl. .................................................. 119/51 R
[58] Field of Search ................. 119/51 R, 52 R, 24, 119/25, 26, 18

[56] References Cited

U.S. PATENT DOCUMENTS

| | | | |
|---|---|---|---|
| 1,525,561 | 2/1925 | Baird | 119/61 |
| 3,399,650 | 9/1968 | Goodman | 119/51 R |
| 3,568,641 | 3/1971 | Kilham | 119/51 R |
| 3,646,911 | 3/1972 | Parson | 119/51 R |
| 3,866,576 | 2/1975 | Downing | 119/18 |
| 4,201,155 | 5/1980 | Hyde | 119/51 R |
| 4,216,742 | 8/1980 | Kirchhofer | 119/18 |
| 4,318,364 | 3/1982 | Bescherer | 119/51 R |

Primary Examiner—Robert Peshock
Assistant Examiner—Kris R. Schulze
Attorney, Agent, or Firm—Frank R. Agovino

[57] ABSTRACT

A bird feeding device is disclosed which can be accessed by birds and not by squirrels. The device comprises a container for holding feed and a wire mesh enclosing the container. An o-ring supports the container within the wire mesh and spaces the mesh away from the container such that the mesh is not directly in contact with the container whereby squirrels are prevented from accessing the container.

11 Claims, 4 Drawing Figures

BIRD FEEDING DEVICE

BACKGROUND OF THE INVENTION

1. Field of the Invention

The invention relates generally to bird feeders and, in particular, a bird feeding device which dispenses bird seed and prevents animals, such as squirrels, from obtaining the seed.

2. Description of the Prior Art

Various bird feeder structures are known in the prior art. For example, U.S. Pat. No. 3,399,650 describes a selective bird feeder for containing suet for outdoor use, being especially constructed to permit feeding of some birds while excluding others. U.S. Pat. No. 3,186,379 describes a feeding device for small birds of the clinging type such as chickadees, nuthatches and woodpeckers. U.S. Pat. No. 3,646,911 discloses a sorghum seed holder bird feeder including an elongated body with diagonal openings on the vertical side thereof for receiving and supporting the stalks of heads of sorghum grains. The body has a hook at the upper end for suspension from a tree branch and the lower end of the body has a removable plug with a downward nail for pounding into a supporting fence, rail or fence post. U.S. Pat. No. 4,318,364 discloses a bird feeding device in which two varieties of granular bird seed may be dispensed in a single device.

Although the feeders of the prior art claim to be squirrel-proof, many feeders require expensive structure to achieve such security or are unnecessarily limited in their ability to dispense seed.

SUMMARY OF THE INVENTION

It is an object of this invention to provide a bird feeding device which is squirrel-proof.

It is another object of this invention to provide a bird feeding device which is inexpensive to manufacture and convenient to use.

It is yet another object of the invention to provide a bird feeding device which is simple in structure.

The apparatus according to the invention is for holding bird food, such as seed, which may be dispensed to birds. The apparatus comprises a container for holding the bird food. The container has openings therein through which birds may access the bird food. First means encloses the container and second means supports the container within the first means and spaces the first means away from the container. Preferably, the first means is a wire mesh and the apparatus is provided with a third means, such as a semi-rigid member, for engaging the wire mesh for hanging the apparatus. Preferably, the second means is an o-ring mounted between the container and the wire mesh.

These features and objects of the invention as well as others will become apparent to one skilled in the art by referring to the accompanying specification and the drawings described therein.

DETAILED DESCRIPTION OF THE INVENTION

Figure 1:
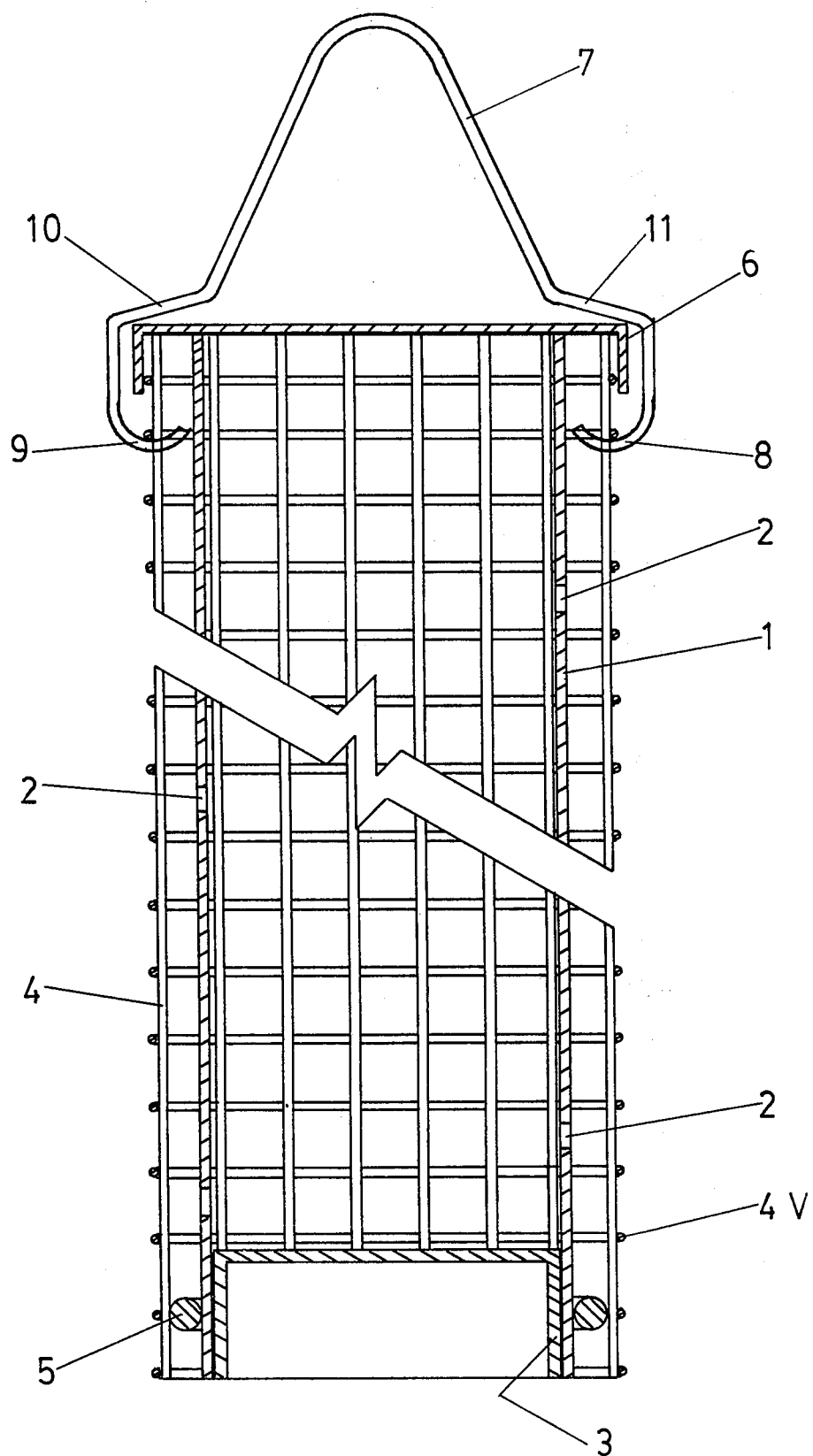
FIG. 1 is a longitudinal sectional view of a bird feeding device according to the invention.
Figure 2:
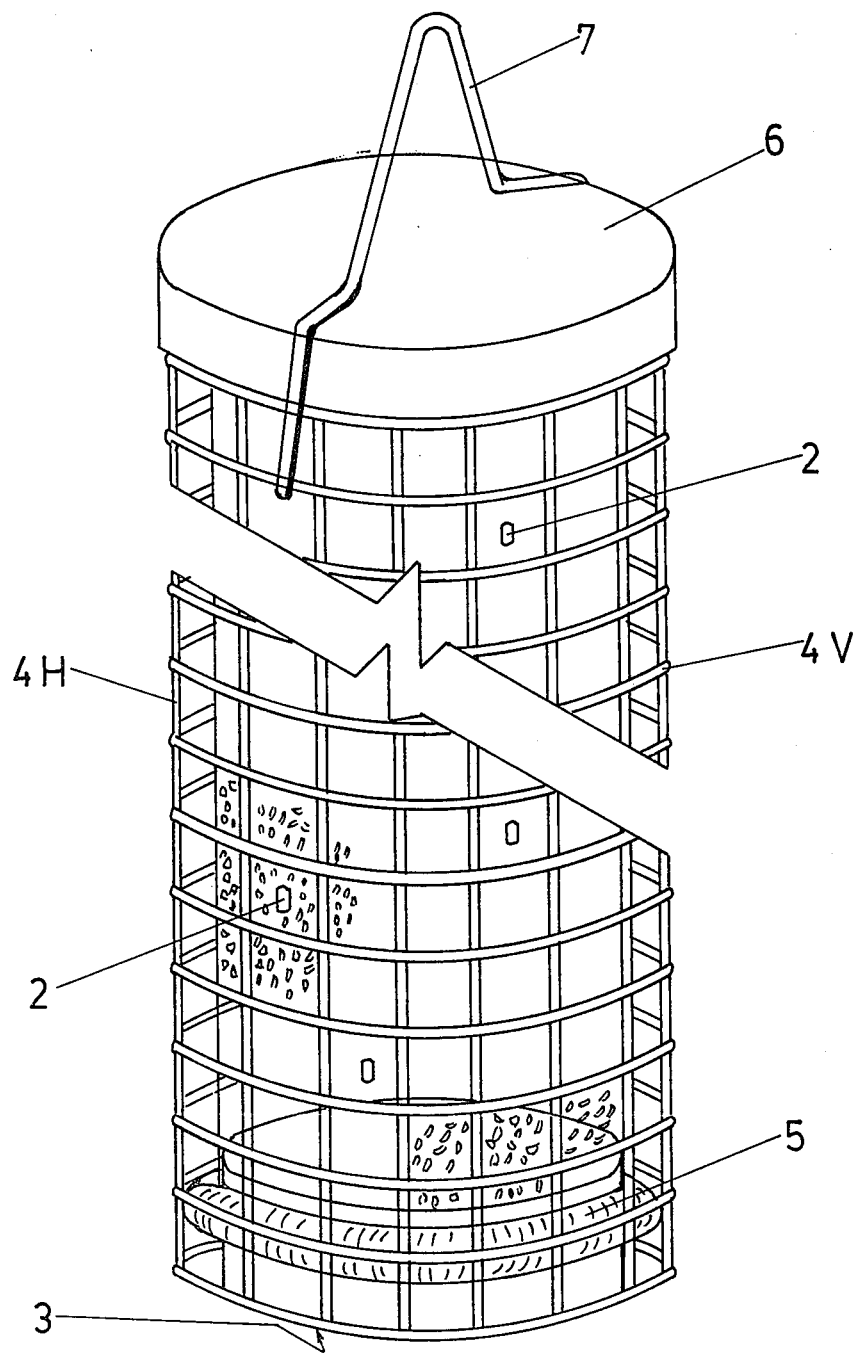
FIG. 2 is a oblique perspective view of a bird feeding device according the invention.
Figure 4:
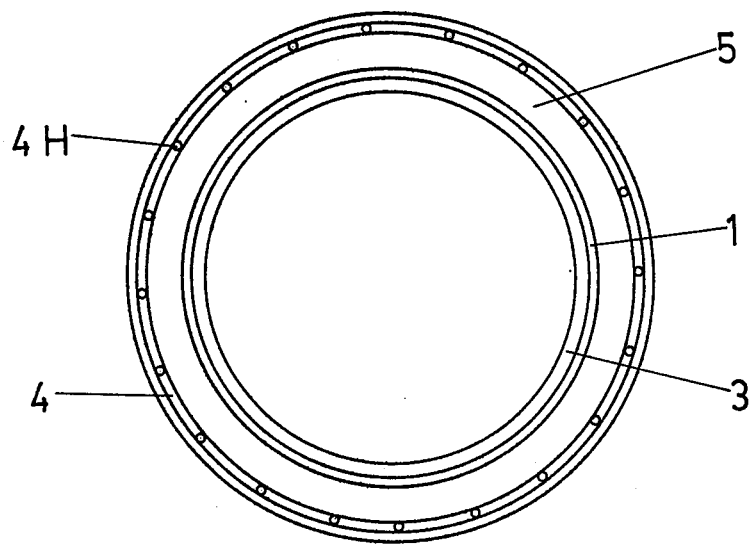
FIG. 4 is a bottom view of the bird feeder illustrated in FIG. 2.
Figure 3:
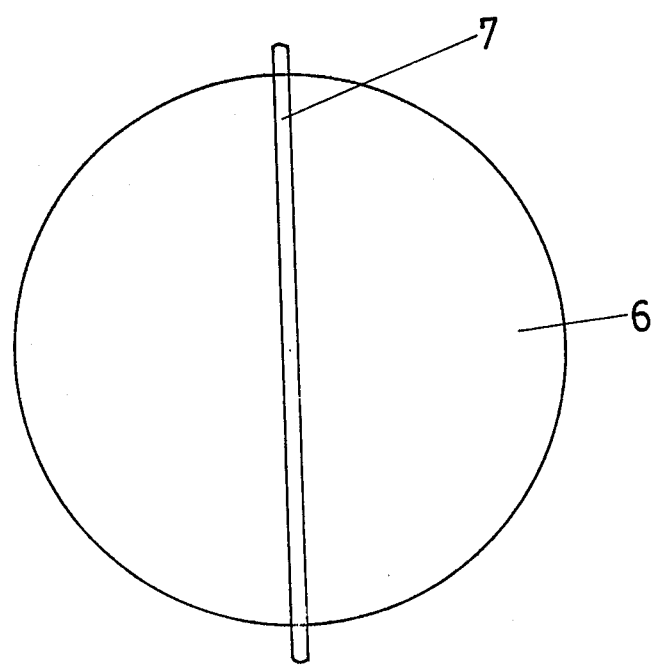
FIG. 3 is a top view of the bird feeder illustrated in FIG. 2.

As illustrated in FIG. 1, container 1 is a plastic cylinder for holding bird food, such as bird seed, Container 1 is provided with one or more openings 2 through which birds may access the food contained therein. Preferably, the holes are sized to dispense one seed at a time for economical feeding.

Container 1 is provided with a bottom cap 3 made of plastic or other convenient material. Cap 3 is wedged in the bottom end of container 1 and may be held in place by glue, staples or other convenient means known in the prior art.

First means are provided for enclosing said container 1. Preferably, said first means is a open structure such as wire mesh 4 having openings of one-third, one-half, three-quarter or one inch. Such open structure may be any standard wire mesh configuration such as vinyl coated wire mesh 4, as illustrated, having horizontal wires 4H connected or welded to vertical wires 4V.

Second means is provided for supporting the container 1 within wire mesh 4 and for spacing wire mesh 4 away from container 1. Preferably, the second means is an o-ring 5 engaging the outer perimeter of the lower portion of container 1 and engaging the inner perimeter of wire mesh 4. The apparatus according to the invention may optionally be provided with an upper o-ring around the upper portion of container 1 (not shown).

A preferred feature of the apparatus according to the invention is the spacing between the container 1 and the wire mesh 4. Without such spacing, animals such as squirrels, may access the container 1. Generally, container 1 is a plexiglass structure which is susceptible to destruction by squirrels because squirrels are able to chew holes in said structure and enlarge the seed holes to access the seeds therein. Container 1 is preferably made of transparent plastic so that the amount of seed therein is readily apparent to the user. By spacing wire mesh 4 away from container 1, squirrels and other animals cannot access container 4, and therefore cause destruction thereto so that the seeds therein may be accessed.

The top portion of the apparatus according to the invention is provided with a top cap 6 which preferably engages the outer perimeter of wire mesh 4. However, the top cap may engage the inner perimeter of the wire mesh (not shown) or the outer perimeter of container 1 (not shown). Maintaining top cap 6 in position and permitting hanging of the apparatus is hanging wire 7 which engages wire mesh 4 at points 8 and 9. Hanging wire 7 is a semi-rigid structure which may be shaped to engage wire mesh 4 and hold top cap 6 in place by the formation of shoulders 10 and 11.

It has been found that goldfinches and pine siskins are able to feed from the apparatus according to the invention and prefer to cling to the wire mesh 4 without the need for perches.

Although the invention has been particularly described with regard to its low costs and squirrel-proof features, it may become readily apparent to those skilled in the art that various other features of the invention are important. Therefore, applicant prefers not to be limited by the above description but by the following claims which describe the scope of his invention.

What is claimed is:

1. An apparatus for holding bird food, such as seed, which can be accessed by birds, said apparatus comprising:
   A. a container for holding bird food said container having sidewalls, the sidewalls having a plurality of spaced apart openings therein through which birds may access the bird food;
   B. a substantially open structure for enclosing said container and for limiting access to said container; and
   C. an O-ring mounted between said container and said structure for supporting said container within said substantially open structure and for spacing said substantially open structure away from said container.

2. The apparatus of claim 1 wherein said substantially open structure is a vinyl coated wire mesh.

3. The apparatus of claim 2 further including means for engaging said wire mesh for hanging said apparatus.

4. The apparatus of claim 3 wherein said means is a semi-rigid member.

5. The apparatus of claim 4 wherein said container is a plastic cylinder having openings therein, a bottom cap for sealing one end of the cylinder and a top cap for sealing the other end of the cylinder.

6. The apparatus of claim 5 wherein said top cap engages said wire mesh.

7. The apparatus of claim 6 wherein said semi-rigid member engages and holds said top cap in place.

8. An apparatus for holding bird food, such as seed, which can be accessed by birds, and not by squirrels, said apparatus comprising:
   (a) a cylindrical container for holding birds food having a plurality of spaced apart openings therein through which birds may access the bird food;
   (b) a wire mesh enclosing said container, said mesh
      (i) preventing access of the container by squirrels,
      (ii) permitting the birds to access the opening in the container, and
      (iii) providing a perch for the birds accessing the openings in the container; and
   (c) means for supporting said container within said wire mesh and for spacing said wire mesh away from said container such that said wire mesh is not directly in contact with the container whereby squirrels are prevented from accessing the container.

9. The apparatus of claim 8 wherein said wire mesh is vinyl coated.

10. The apparatus of claim 9 wherein said container comprises transparent plastic.

11. The apparatus of claim 10 further comprising a bottom cap for sealing one end of the container, top cap for sealing the other end of the container and a semi-rigid member engaging the wire mesh and the top cap for hanging said apparatus and for holding the top cap in place.

* * * * *